Patented July 10, 1945

2,379,948

UNITED STATES PATENT OFFICE 2,379,948

ORGANIC ISOCYANATES

Edward Burgoine, Benjamin Collie, and Randal George Arthur New, Blackley, Manchester, England, assignors to Imperial Chemical Industries Limited, a corporation of Great Britain No Drawing. Application June 29, 1943, Serial No. 492,782. In Great Britain June 29, 1942

3 Claims. (Cl. 260—453)

This invention relates to improvements in or relating to the manufacture of organic isocyanates.

It has already been proposed to manufacture aromatic isocyanates by causing phosgene to react on salts of aromatic amines and to manufacture aliphatic isocyanates by causing phosgene to react on hydrogen halides of primary aliphatic amines under such conditions that the hydrogen halides formed during the reaction are removed from the reaction mixture. Further, in connection with this latter proposal it has also been proposed to carry out the operation by passing phosgene into suspensions of the salts in organic liquids which are inert to the reaction components and which dissolve hydrogen halides only with difficulty, for example in chlorobenzene, dichlorobenzene, toluene or xylene.

In working according to these prior proposals it is essential to use dry amine salts for the phosgenation reaction, and these have usually been prepared by causing dry hydrogen chloride to react with a solution or suspension of the amine in the organic liquid to be used as the suspending medium. Owing to ready availability and ease of handling it would be a great convenience to use the commercially available aqueous solutions of hydrogen chloride for converting the amines into the corresponding hydrochlorides. However, the use of aqueous solutions introduces the problem of obtaining satisfactory dry salts. When dry salts are obtained merely by removing water by evaporation from aqueous solutions, the salts are obtained in the form of coarse lumps which are not easily or rapidly converted into isocyanates by phosgenation.

We have now found that, when aqueous solutions of hydrogen chloride are used for the manufacture of hydrochlorides of primary amines, these hydrochlorides may be obtained in a finely divided form by first forming emulsions of their aqueous solutions in organic liquids such as are to be used as suspending media for the salts in the phosgenation reaction, and then removing water from the emulsions by evaporation. The suspensions of finely divided salts obtained in this way are well suited for the production of isocyanates by phosgenation.

According to the present invention, in the manufacture of organic isocyanates by reacting phosgene with a primary amine hydrochloride suspended in an organic liquid, we provide the improvement which comprises obtaining said suspension by removing water from an emulsion of an aqueous solution of the amine hydrochloride in the organic liquid.

As primary amines there may be used those of the aliphatic, cycloaliphatic and aromatic series, for example hexamethylene diamine, cyclohexylamine, benzylamine, and aniline.

As organic liquids there may be used substantially water-insoluble liquids which are inert to the reaction components. Preferably, they are solvents for the amines, since this facilitates the production of the emulsions. Toluene, chlorobenzene and o-dichlorobenzene have been found to be suitable.

The emulsion is conveniently obtained by dissolving the free amine in an organic liquid and then simultaneously forming the emulsion and converting the amine into its hydrochloride by mixing in an aqueous solution of hydrogen chloride. Other methods may also be used, for instance, an aqueous solution of the hydrochloride may be mixed into the organic liquid. Water is removed from the emulsion by heating under conditions such that the organic liquid and the water are removed by distillation and condensed. The organic liquid is separated from the condensate and returned, thereby assisting in the removal of further water from the emulsion.

It is advantageous to add to the emulsion a material which will stabilise emulsions of the water-in-oil kind. Suitable materials are amide sulphonates, alkyl sulphates or quaternary salts, for example, sodium oleyl-p-anisidine sulphonate, cetyl sodium sulphate and cetyl pyridinium bromide, with or without the addition of lanoline. Such materials are added prior to the removal of the water from the emulsion.

The suspensions of the amine hydrochlorides may be used for the production of isocyanates by phosgenation in accordance with conventional practice.

The invention is illustrated but not limited by the following examples, in which the parts are expressed by weight.

Example 1

To a solution of 100 parts cyclohexylamine dissolved in 175 parts toluene are added 1.3 parts lanoline and 1.3 parts technical sodium oleyl-p-anisidine sulphonate. The resulting mixture is agitated and neutralised with a sufficiency of an aqueous solution of hydrochloric acid. About 110 parts of a 35% solution are required. The emulsion so formed is boiled whilst agitating, under conditions whereby toluene and water are condensed and the toluene is separated from the condensate and returned to the boiling mixture, until all of the water is removed. There is thus obtained cyclohexylamine hydrochloride in finely divided form suspended in toluene.

The salt is converted into cyclohexyl isocyanate by treating the suspension with an excess of phosgene. A yield of 91.5% of a product boiling at 48–52° C. at 15 mm. is obtained.

*Example 2*

To a solution of 116 parts hexamethylenediamine in 740 parts o-dichlorobenzene are added 1.8 parts lanoline and 1.8 parts technical sodium oleyl-p-anisidine sulphonate. The resulting mixture is agitated and neutralised with a sufficiency of an aqueous solution of hydrochloric acid. About 207 parts of a 35% solution are required. The emulsion so formed is boiled whilst agitating, under conditions whereby the o-dichlorobenzene and water are condensed and the o-dichlorobenzene is separated from the condensate and returned to the boiling mixture, until all of the water is removed. There is thus obtained hexamethylenediamine dihydrochloride in finely divided form suspended in o-dichlorobenzene.

Similar products are obtained by using in place of the technical oleyl-p-anisidine sulphonate 1.8 parts of technical cetyl sodium sulphate or 1.8 parts of technical cetyl pyridinium bromide.

The salt is converted into hexamethylene diisocyanate by treating the suspension with an excess of phosgene. A yield of 86% of a product boiling at 130° C. at 13 mm. is obtained.

*Example 3*

To a solution of 135 parts benzylamine in 500 parts chlorobenzene are added 1.8 parts lanoline and 1.8 parts technical sodium oleyl-p-anisidine sulphonate. The resulting mixture is agitated and neutralised with a sufficiency of an aqueous solution of hydrochloric acid. About 130 parts of a 35% solution are required. The emulsion so formed is boiled whilst agitating, under conditions whereby the chlorobenzene and water are condensed and the chlorobenzene is separated from the condensate and returned to the boiling mixture, until all of the water is removed. There is thus obtained benzylamine hydrochloride in finely divided form suspended in chlorobenzene.

The salt is converted into benzyl isocyanate by treatment with an excess of phosgene. A yield of 80% of a product boiling at 83 to 90° C. at 13 mm. is obtained.

We claim:

1. In the manufacture of organic isocyanates by reacting phosgene with a primary amine hydrochloride suspended in an organic liquid, the improvement which comprises obtaining said suspension by removing water, by evaporation, from an aqueous emulsion, in the organic liquid, of an aqueous solution of the amine hydrochloride, said emulsion being stabilised by the addition of a material which will stabilise emulsion of the water-in-oil kind.

2. In the manufacture of hexamethylene diisocyanate by reacting hexamethylenediamine dihydrochloride suspended in o-dichlorobenzene the improvement which comprises obtaining the suspension by evaporating water from an aqueous emulsion wherein the diamine dihydrochloride dissolved in water is in an emulsion in o-dichlorobenzene containing a stabilizer for emulsions of the water-in-oil kind.

3. In the manufacture of organic isocyanates by reacting phosgene with a primary amine hydrochloride suspended in an organic liquid, the improvement which comprises obtaining said suspension by removing water by distillation from an aqueous emulsion wherein the amine hydrochloride, dissolved in water, is in an emulsion in the organic liquid which emulsion is stabilized by means of a stabilizer for water in oil emulsions.

EDWARD BURGOINE.
BENJAMIN COLLIE.
RANDAL GEORGE ARTHUR NEW.